United States Patent [19]

Kelley, Jr.

[11] Patent Number: 5,301,757
[45] Date of Patent: Apr. 12, 1994

[54] EDGING MACHINE

[76] Inventor: Milton C. Kelley, Jr., 4901 Saint Andrews, Baytown, Tex. 77521

[21] Appl. No.: 933,079

[22] Filed: Aug. 21, 1992

[51] Int. Cl.$^5$ .................. A01D 34/74; A01D 34/84; A01D 34/68
[52] U.S. Cl. .................................. 172/15; 172/43; 172/423; 172/354; 56/17.2; 56/12.7; 56/256
[58] Field of Search ................ 56/17.2, 256, 12.7; 172/15, 16, 43, 423, 354

[56] References Cited

U.S. PATENT DOCUMENTS

| | | | |
|---|---|---|---|
| 2,051,443 | 8/1936 | Gravely | 172/43 |
| 2,691,264 | 10/1954 | Miller | 56/256 |
| 3,690,384 | 9/1972 | Patterson | 172/15 |
| 3,710,563 | 1/1973 | Polette et al. | 172/16 X |

*Primary Examiner*—Randolph A. Reese
*Assistant Examiner*—Christopher J. Novosad
*Attorney, Agent, or Firm*—Harrison & Egbert

[57] ABSTRACT

An edging machine having a frame with a handle at one end, a prime mover mounted on the frame, an edger blade rotatably connected to the frame, a first wheel mounted on the frame so as to support the frame above a surface, a second wheel interconnected to the frame and arranged in tandem with the first frame, an adjustment lever interconnected to the second wheel for changing a distance of the frame from the surface. A guide member is rotatably connected to the frame so as to have a surface extending below the frame. The guide member is positioned in parallel relationship to the edger blade. The second wheel is rotatably mounted to a wheel bar. The wheel bar is pivotally connected to the frame on a side of the frame opposite the edger blade. The adjustment lever is interconnected to the wheel bar so as to controllably adjust the position of the second wheel relative to the frame.

11 Claims, 2 Drawing Sheets

EDGING MACHINE

TECHNICAL FIELD

The present invention relates generally to home gardening tools. More particularly, the present invention relates to powered edging machines.

BACKGROUND ART

The practice of gardening and yard care commonly requires breaking up the surface of the ground along the edges of sidewalks and curbs in order to highlight the edges of a yard. In the prior art, home gardeners have used hand tools, such as hoes, for this purpose. Hoes have been manufactured in an assortment of configurations. Hoes are generally manually operated and include a cutting portion attached to a long handle. By forcing the cutting portion along the ground in one direction, by means of the handle, the cutting portion breaks up the surface of the dirt.

The use of manually-operated garden tools, including hoes, involves exhausting physical labor expended over a great amount of time. As a result, numerous labor-saving power tools have been developed.

One such power tool, the gasoline-engine powered edger, has gained rapid acceptance since its introduction on the market. The edger is used to trim lawns around the edges of sidewalks, curbs and gardens and includes a rapidly rotating flat blade that rotates about a horizontal shaft. The shaft, in turn, is connected to the engine by a belt and pulley system. The entire operating unit is mounted on a mobile frame that is pushed by the operator by means of a handle extending above the rear of the frame. By aligning the plane in which the blade rotates over the portion of the lawn to be edged, and then lowering the blade, the operator can trim the lawn by simply pushing the edger along the path to be edged.

Unfortunately, conventional edging machines are quite difficult to operate along the edges of curbs. Since curbs have a generally curved configuration, it is difficult to manipulate the wheels of conventional edgers so as to properly follow the edge of the curb. In conventional edging machines, the wheels are commonly a foot or more away from the edging blade. On curbs, this distance can mean that the wheels of the edger must be supported on the street in order to properly edge. Alternatively, and typically, the operator of the edging machine will attempt to lift the wheels into the air so that they can approximate the level surface of the curb. In general, existing techniques for edging along curbs are very time-consuming and difficult. Since the edging machine is not properly balanced on curbs, the edging machine can be operated in a hazardous manner. As such, a need has developed for the creation of an edging machine which is particularly adapted for edging lawns along curbs.

It is an object of the present invention to provide an edging machine that is particularly adapted for edging along curbs.

It is another object of the present invention to provide an edging machine that can guide the edger along a surface of a sidewalk or curb.

It is still a further object of the present invention to provide an edging machine that includes adjustment mechanisms for adjusting the depth of the cut of the edger blade.

These and other objects and advantages of the present invention will be come apparent from a reading of the attached specification and appended claims.

SUMMARY OF THE INVENTION

The present invention is an edging machine that comprises a frame having a handle at one end, a prime mover mounted on the frame, an edger blade rotatably connected to the frame, a first wheel mounted on the frame so as to support the frame above a surface, a second wheel interconnected to the frame and arranged in generally tandem alignment with the first wheel, and an adjustment mechanism interconnected to the second wheel for changing a distance of the frame from the surface. The second wheel is positioned within two inches of the edger blade.

The prime mover is a motor that has a power of no less than two horsepower. The edger blade is rotatably mounted on a shaft. The shaft has a pulley connected thereto. The prime mover includes a belt which extends around the pulley for rotating the edger blade. Specifically, the shaft is rotatably mounted within a bearing housing on the frame. The edger blade is fixedly mounted to the shaft. The pulley is connected to the shaft such that a rotation of the pulley causes a corresponding rotation of the edger blade.

In the present invention, a guide member is rotatably connected to the frame so as to have a surface which extends below the frame. This guide member is positioned in parallel relationship to the edger blade. The guide member is a metallic disk having a diameter less than a diameter of the second wheel.

The second wheel is rotatably mounted on a wheel bar. The wheel bar is pivotally connected to the frame on a side of the frame opposite to the edger blade. The adjustment mechanism utilizes an adjustment lever pivotally mounted adjacent to the handle of the frame. A strut has one end connected to this adjustment lever and another end connected to the wheel bar. The strut is connected to a portion of the wheel bar on a side of the pivotal connection opposite the second wheel. An abutment member is connected to the handle of the frame below the adjustment lever. The abutment member has a surface for setting a position of the adjustment lever. Specifically, the abutment member is a triangular block which is mounted to the frame, adjacent to the handle, in off-center pivotal connection.

A kickstand may be provided adjacent to the first wheel. This kickstand is pivotally connected to the frame so as to extend downwardly for the support of the edger machine in an upright manner.

DETAILED DESCRIPTION OF THE INVENTION

Figure 1:
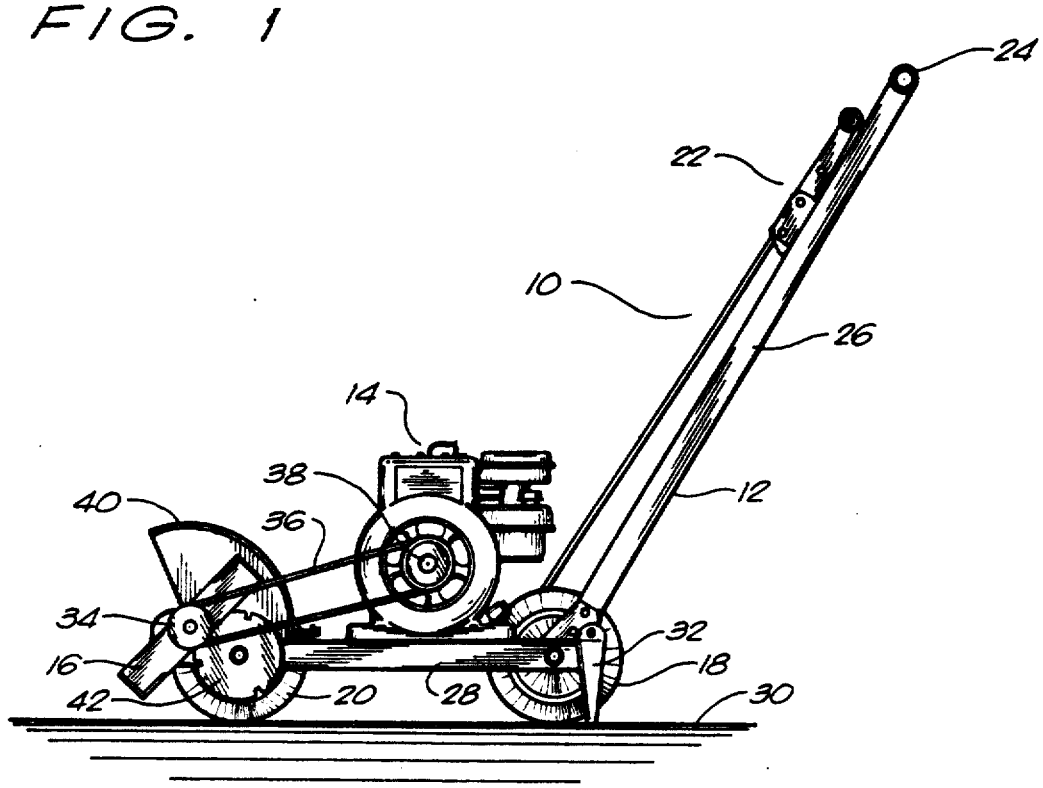
FIG. 1 is a view in side elevation of the edging machine in accordance with the preferred embodiment of the present invention.

Referring to FIG. 1, there is shown at 10 the edging machine in accordance with the preferred embodiment of the present invention. Edging machine 10 includes a frame 12, a prime mover 14, an edger blade 16, a first wheel 18, a second wheel 20, and an adjustment mechanism 22. Each of these components interacts so as to provide the benefits of the present invention and to provide an edging machine which is suitable for edging around curved surfaces, such as curbs.

Initially, it can be seen that the frame 12 extends upwardly at an angle toward a handle 24. Handle 24 is a T-bar which extends outwardly so as to allow an operator to easily grasp the end of the frame 12. An angled member 26 extends downwardly from handle 24 and is connected to the horizontal portion 28 of frame 12. The angled member 26 and horizontal portion 28 can be bolted, fastened, or formed together. Wheel 18 is rotatably connected to the horizontal portion 28 of frame 12. As can be seen, the first wheel 18 is suitable for supporting the frame 12 above a surface 30. The wheel 18 has a configuration suitable for rolling along the surface 30. A kickstand 32 is rotatably connected to the frame 12. Kickstand 32 is illustrated in its lowered position for the purpose of supporting the edging machine 10 in an upright position. It should be noted that the kickstand 32 can be pivoted so as to be in a position in which the kickstand 32 does not engage the surface 30.

The prime mover 14 is illustrated as being a gasoline-powered engine which is mounted to the horizontal portion 28 of frame 12. Prime mover 14 should have two horsepower or greater. Experimentation has indicated that two horsepower is necessary so as to allow the edger blade 16 to properly break up the soil along the edge of surface 30. It should be noted, however, that within the scope of the present invention, other types of prime movers, such as electrical engines, could also be included. It is possible that the present invention could operate properly with less than two horsepower. As such, the present invention should not be limited to the use of gasoline-powered engines or to only those engines producing greater than two horsepower.

The edger blade 16 is rotatably connected to one end of horizontal portion 28 of frame 12. The edger blade 16 is a planar member which rotates so as to carry out the edging process. Initially, it can be seen that a pulley 34 is interconnected to the edging blade 16. A belt 36 extends from the prime mover 14 to the pulley 34 of edger blade 16. In this manner, the rotation of the driving member 38 of prime mover 14 will cause a corresponding rotation of the pulley 34 and the edger blade 16. The edger blade 16 is shown as maintained within a housing 40. The housing 40 can have the configuration shown in FIG. 1 or it can fully extend around the edger blade 16 so as to prevent access to the edger blade and potential injury. The housing 40 is illustrated in quarter-circle fashion for the purposes of more clearly showing the present invention. In the preferred embodiment of the present invention the housing 40 will extend substantially around the area of rotation of the edger blade 16, in the manner of conventional edging machines. The housing 40 is suitably mounted to the top surface of the horizontal portion 28 of frame 12.

FIG. 1 also shows that a guide member 42 is rotatably mounted to a surface of the horizontal portion 28 of frame 12. As will be described hereinafter, the guide member 42 is a metal disk which rotates relative to the frame 12 for the purposes of allowing the edging machine 10 to properly traverse the edge of a curb, a sidewalk, or other surface.

FIG. 1 also shows that the second wheel 20 is interconnected to the frame 12 and arranged in generally tandem relationship to the first wheel 18. The adjustment mechanism 22 is configured so as to properly adjust the position of the second wheel 20 for the purposes of setting the depth of cut by the edger blade 16.

Figure 2:
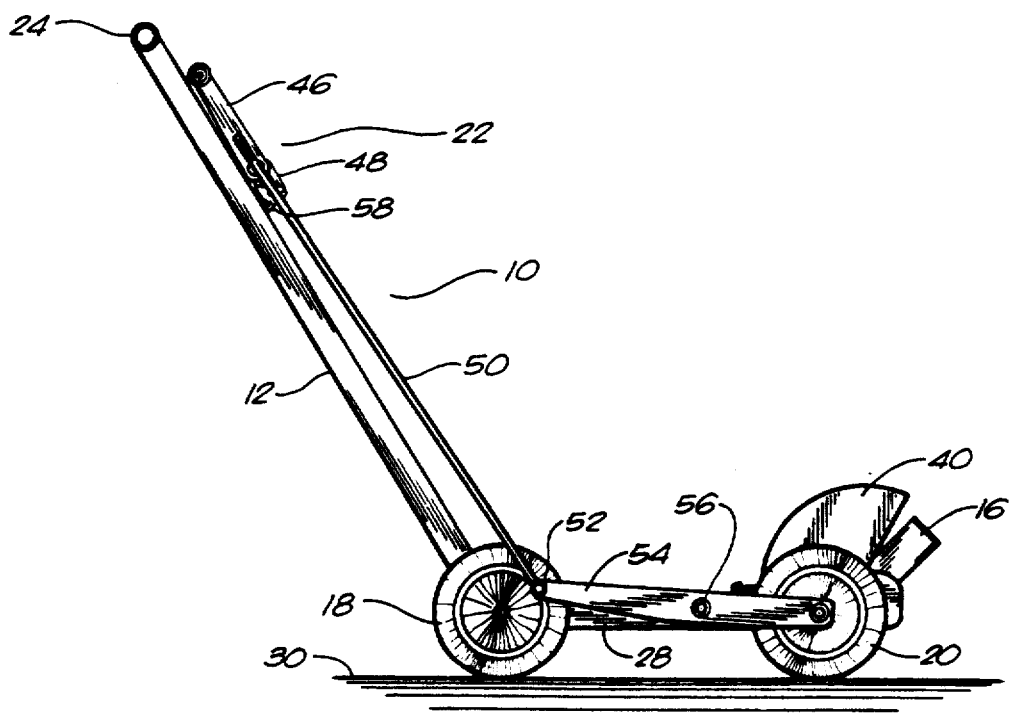
FIG. 2 is an opposite side view of the edging machine (minus the prime mover) in accordance with the preferred embodiment of the present invention.

FIG. 2 shows the opposite side of the edging machine 10. Specifically, it can be seen in the view of FIG. 2 that the prime mover 14 has been removed (for the purposes of clarity of illustration). The frame 12 has handle 24 at one end and horizontal portion 28 at another end. The first wheel 18 is specifically connected to the frame 12 in rotatable relationship. FIG. 2 also shows the appearance of the edger blade 16 and its housing 40 (illustrated partially).

Most importantly, FIG. 2 shows the arrangement of the adjustment mechanism 22 of the present invention. The adjustment mechanism 22 includes an adjustment lever 46 which is pivotally connected to a bracket 48 positioned generally adjacent to the handle 24. A strut 50 is hingedly connected to the adjustment lever 46, at one end, and is pivotally connected at 52 to a wheel bar 54 at another end. The wheel bar 54 has the second wheel 20 rotatably connected thereto. In the preferred embodiment of the present invention, the movement of the second wheel 20 will be independent of the first wheel 18. Specifically, the manipulation of the adjustment lever 46, in combination with the wheel bar 54, serves to move the second wheel 20 upwardly and downwardly. This action, in turn, causes the horizontal portion 28 of frame 12 to change its distance from the surface 30.

The pivotal connection 56 of the wheel bar 54 to the horizontal portion 28 of frame 12 is positioned generally forward of the position of the prime mover 14. The location of this pivotal connection 56 has been determined to add stability to the operation of the device and to allow for the proper manipulation of the edging machine 10. As will be described hereinafter, an abutment member 58 is connected to the bracket 48 adjacent to the handle 24 of frame 12. The abutment member 58 serves as a suitable surface for allowing the setting of the adjustment lever 46.

In normal use, as the adjustment lever 46 is rotated about its hinged connection with bracket 48 downwardly, strut 50 and wheel bar 54 will cause the wheel 20 to rise. This action, in turn, causes the horizontal portion 28 of frame 12 to lower toward surface 30 and also causes the edging blade 16 to carry out a deeper cut. The amount of movement (upwardly or downwardly) of wheel 20 will be determinative on the depth of cut by the edger blade 16.

Figure 3:
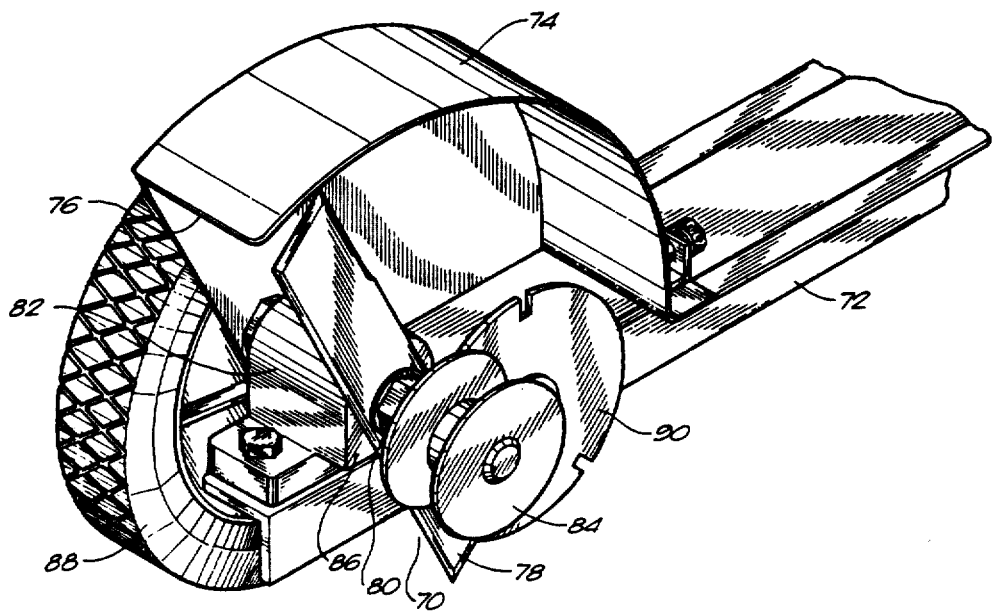
FIG. 3 is a perspective view showing the details of the edger blade configuration.

FIG. 3 is a close-up view showing the configuration of the edger blade mechanism 70 of the present invention. Initially, the horizontal portion 72 of the frame may be an angle iron or equivalent structure. The housing 74 is fastened to the top surface of the horizontal portion 72 of the frame. In FIG. 3, the housing 74 is only partially illustrated. In normal use, the housing 74 will extend downwardly such that its lower edge 76 will be adjacent to the bottom of frame 72.

The edger blade 78 is rotatably connected to a shaft 80. Shaft 80 is received within bearing housing 82. The edger blade 78 is affixed to the outer diameter of shaft 80. The shaft 80 is rotatably received within bearing housing 82. A pulley 84 is also affixed to the exterior surface of shaft 80. Pulley 84 has a configuration suitable for receiving the belt 36 from the prime mover (as shown in FIG. 1). Typically, the pulley 84 may be affixed to the shaft 80 by a set screw, or by other means. The rotation of the pulley 84 will cause a rotation of the shaft 80 and the attached edger blade 78. The surface 86 of bearing housing 82 is positioned so as to be in close proximity to the inner edge of the edger blade 78. It can be seen that the bearing housing 82 may be bolted to, or otherwise attached to, the top surface of the horizontal portion 72 of the frame. The second wheel 88 is illustrated in FIG. 3, in close proximity to the edger blade 78. Preferably, the wheel 88 will be positioned within two inches of the edger blade 78. The close proximity between the wheel 88 and the edger blade 78 enhances the ability of the present invention to be able to be used on curbs or other curved surfaces. During normal use, the wheel 88 can be rolled along the curved surface of a curb while the edger blade properly edges along the inner surface of the curb.

Importantly, the present invention enhances the ability to edge along such surfaces by incorporating a guide member 90. Guide member 90 is rotatably connected to the horizontal portion 72 of the frame. Typically, the guide member 90 is a metallic disk. In normal use, the guide member 90 will abut the side of a curb adjacent to the lawn. This assures that the edger blade 78 will properly cut and dig in close proximity to the surface of the curb. The use of a rotatable disk 90 enhances the smoothness and stability of the operation. The use of the metallic disk avoids the problems of abrasion which can occur from rubbing a plastic surface against concrete. In the preferred embodiment of the present invention, the guide member 90 should be within two inches of the wheel 88. Ideally, and preferably, the distance between the guide member 90 and the wheel 88 will be one and one-half inches.

Figure 4:
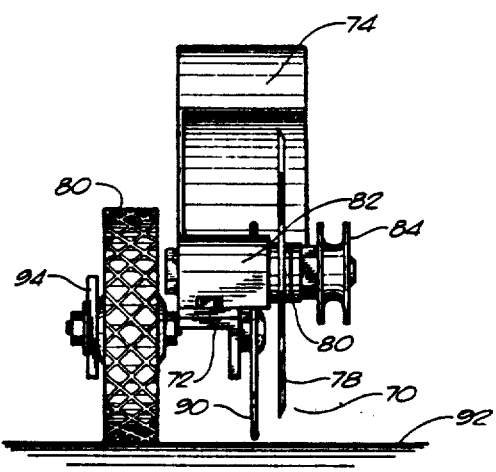
FIG. 4 is an end view of the edger blade configuration of the present invention.

FIG. 4 shows the arrangement of the items within the edger blade assembly 70. The horizontal portion 72 of the frame serves as a surface for receiving the items of the edger blade assembly. The housing 74 extends upwardly from the frame 72 as illustrated. It can be seen that the edger blade 78 has a planar configuration which is supported on shaft 80. The bearing housing 82 is positioned on the frame 72. Bearing housing 82 receives the shaft 80. Bearing housing 82 extends outwardly toward the edger blade 78 beyond the edge of the frame 72. The pulley 84 is affixed to the shaft 80 on the side of the edger blade 78 from the bearing housing 82. The guide member 90 includes a portion which extends below the bottom edge of the frame 72.

In FIG. 4, it can be seen that wheel 88 serves to support the frame 72 above the surface 92. As illustrated, the wheel 80 is rotatably connected to wheel bar 94. The movement of the wheel bar 94 will serve to raise and lower the position of the frame 72 with respect to the surface 92. For example, when it is not desired to lower the edger blade 78 for the purpose of making a cut, it is only necessary to raise the wheel bar 94. The pivotal connection between the wheel bar 94 and the frame 72 will cause the frame 72 to properly lower.

Figure 5:
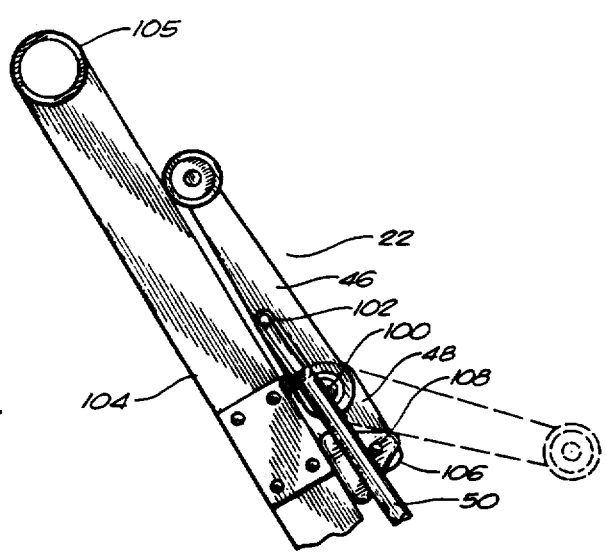
FIG. 5 is a detailed view of the adjustment lever as mounted on the handle of the present invention.

FIG. 5 shows the operation of the adjustment mechanism 22 for the purposes of raising and lowering the frame with respect to the second wheel. Initially, it can be seen that the adjustment lever 46 is pivotally connected at 100 to the bracket 48. The strut 50 is hinged at 102 to the adjustment lever 46. The bracket 48 is mounted, welded, or formed to the frame portion 104 adjacent to the handle 105. The strut 50 extends downwardly from the adjustment lever 46.

Importantly, an abutment member 106 is mounted to the bracket 48 at an off center pivot 108. The use of the off center pivot means that each side of the triangular shape of the abutment member 106 will provide a different angular displacement of the adjustment lever 46 when it is in its lowered position (illustrated in dotted line fashion). The adjustment lever 46 will rest in surface-to-surface contact with the triangular block 106. The three sides of the triangular block 106 will represent three different fixed settings for the depth of the cut by the edger blade. Since the adjustment lever 46 rests in surface-to-surface contact, as opposed to being locked in position, the adjustment lever 46, in combination with the abutment member 106 will provide a shock-absorbing benefit. In other words, the certain degree of resiliency to the edging process. The use of the block 106 is also superior since it does not require the operator to take his eyes off the positioning action to adjust the depth of the cut. There is no need to find a particular slot or to manipulate a screw or other adjustment mechanism. The lever 46 is simply moved so as to allow the edge of the lever to abut block 106.

The present invention offers a superior technique for the edging of curbs, sidewalks, and other surfaces. The close proximity of the wheels to the edging blade avoids the problem of maintaining the wheels on a level surface. The present invention does not require the difficult balancing act used with conventional edgers. The use of the two horsepower motor further enhances the ability of the edging blade to cut quickly and deeply along the curbing. The rotatable guide member enhances the ability to carry out the curb edging activities in an extremely quick and efficient manner.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. An edging machine comprising:
   a frame having a handle at one end, said frame having a first wheel thereon for supporting said frame above a surface;
   a prime mover means mounted on said frame;
   an edger blade rotatably connected to said frame, said edger blade in driving connection with said prime mover means;
   a second wheel interconnected to said frame and arranged in generally tandem alignment with said first wheel, said second wheel positioned within two inches of said edger blade, said edging machine having two and only two wheels; and
   adjustment means interconnected to said second wheel for changing a distance of said frame from the surface.

2. The edging machine of claim 1, said prime mover means comprising a motor having a power of not less than two horsepower.

3. The edging machine of claim 1, said edger blade mounted on a shaft, said shaft having a pulley connected thereto, said prime mover means having a belt ext ending around said pulley for rotating said edger blade.

4. The edging machine of claim 3, said shaft rotatably mounted within a bearing housing on said frame, said edger blade fixedly mounted to said shaft, said pulley fixed connected to said shaft such that a rotation of said pulley causes a corresponding rotation of said edger blade.

5. The edging machine of claim 1, further comprising:
a guide member rotatably connected to said frame, said guide member having a surface extending below said frame, said guide member positioned in parallel relation to said edger blade.

6. The edging machine of claim 5, said guide member being a metallic disk having a diameter less than a diameter of said second wheel.

7. The edging machine of claim 1, said second wheel being rotatably mounted on a wheel bar, said wheel bar pivotally connected to said frame on a side of said frame opposite said 8. The edging machine of claim 7, said adjustment means comprising:
an adjustment lever pivotally mounted adjacent said handle of said frame; and
a strut having one end connected to said adjustment lever, said strut having another end connected to said wheel bar, said strut connected to a portion of said wheel bar on a side of the pivotal connection opposite said second wheel.

9. The edging machine of claim 8, further comprising:
an abutment member connected to said handle of said frame below said adjustment lever, said abutment member having a surface for setting a position of said adjustment lever.

10. The edging machine of claim 9, said abutment member comprising:
a triangular block being mounted in off-center relationship adjacent said handle of said frame.

11. The edging machine of claim 8, said pivotal connection of said wheel bar with said frame being positioned forward of said prime mover means on said frame.

* * * * *